United States Patent
Lo et al.

(10) Patent No.: US 9,471,124 B2
(45) Date of Patent: Oct. 18, 2016

(54) PORTABLE ENERGY MANAGEMENT DEVICE, POWER MANAGEMENT MODULE, AND POWER MANAGEMENT METHOD

(71) Applicant: Metalligence Technology Corporation, Hsinchu (TW)

(72) Inventors: Ming-Ling Lo, New Taipei (TW); Wen-Ning Tseng, New Taipei (TW); Shih-Chiea Chen, New Taipei (TW); Chung-Cheng Hsu, Hsinchu (TW)

(73) Assignee: METALLIGENCE TECHNOLOGY CORPORATION, Hsinchu (TW)

( * ) Notice: Subject to any disclaimer, the term of this patent is extended or adjusted under 35 U.S.C. 154(b) by 102 days.

(21) Appl. No.: 14/568,080

(22) Filed: Dec. 11, 2014

(65) Prior Publication Data

US 2015/0293570 A1    Oct. 15, 2015

(30) Foreign Application Priority Data

Apr. 15, 2014    (TW) .............................. 103113715 A

(51) Int. Cl.
    *G06F 1/26*    (2006.01)

(52) U.S. Cl.
    CPC ......... *G06F 1/266* (2013.01); *G06F 2200/261* (2013.01)

(58) Field of Classification Search
    CPC ...... G06F 1/3202; G06F 1/3231; G06F 1/26; G06F 1/206; G06F 1/3228; G06F 1/08; G06F 1/3289; G06F 1/266; H04L 12/12; H04L 12/10
    IPC .................. G06F 1/3202, 1/3231, 1/26, 1/206, G06F 1/3228, 1/08, 1/3289, 1/266; H04L 12/12,12/10

See application file for complete search history.

(56) References Cited

U.S. PATENT DOCUMENTS

| | | | | |
|---|---|---|---|---|
| 6,507,273 | B1 * | 1/2003 | Chang | G05B 15/02 340/12.32 |
| 7,069,462 | B2 * | 6/2006 | Owen | G06F 1/3203 713/300 |
| 7,663,267 | B2 * | 2/2010 | Yun | H02M 1/10 307/80 |

(Continued)

FOREIGN PATENT DOCUMENTS

| | | |
|---|---|---|
| CN | 202189966 U | 4/2012 |
| CN | 103178410 A | 6/2013 |
| TW | M441253 | 11/2012 |

*Primary Examiner* — Zahid Choudhury
(74) *Attorney, Agent, or Firm* — CKC & Partners Co., Ltd.

(57) ABSTRACT

A portable energy management device, disposed between a power outlet and an appliance load when being used, includes a transmission module, a micro processing unit, a schedule module, and a power control circuit. The transmission module communicates with a remote control device by receiving or sending a wireless signal or a cable signal, through which schedule commands are transmitted. The micro processing unit performs analysis and identification of the appliance load, and information related to the appliance load is sent to the remote control device through the transmission module. The schedule module executed by the micro-processing unit stores and runs the schedule commands. The power control circuit is controlled by schedule commands to determine whether power should be supplied.

17 Claims, 6 Drawing Sheets

(56) References Cited

U.S. PATENT DOCUMENTS

2010/0114396 A1* 5/2010 Benson ............... H02J 3/14
700/295
2013/0227323 A1* 8/2013 Stafford ............ H04N 21/4436
713/323
2013/0261821 A1* 10/2013 Lu ................... H04L 12/2807
700/289
2014/0101346 A1* 4/2014 Naaman ............... G06F 13/10
710/19
2015/0212532 A1* 7/2015 Hsu ................... G05B 15/02
700/14

* cited by examiner

PORTABLE ENERGY MANAGEMENT DEVICE, POWER MANAGEMENT MODULE, AND POWER MANAGEMENT METHOD

RELATED APPLICATIONS

This application claims priority to Taiwan Application Serial Number 103113715, filed Apr. 15, 2014, which is herein incorporated by reference.

BACKGROUND

1. Technical Field

The present disclosure relates to energy management devices and power management methods. More particularly, the present disclosure relates to the energy management device and power management method of an appliance load.

2. Description of Related Art

With the development and advance of technology, there are more and more types of electrical appliance products, especially for each with its own characteristics of power consumption. Some only require a small amount of power to operate while some consume a great deal of power to function. With the variety of electrical appliance products, how to achieve the best result while using the products is not just a matter of energy consumption or environmental friendliness. The proper usage and operation of these products is closely related to safety. Therefore, some administrative organizations propose different safety standard regulations targeting different types of power sockets to restrict usage of electrical appliance products through regulating usage of power sockets.

Conventional power sockets are used to provide power and lack the ability to supply or cut off the power at a certain time according to a scheduled plan of a user. They can neither receive remote control to supply or cut off the power. Furthermore, conventional power sockets cannot identify a type of an appliance load, so naturally they are unable to provide power to different appliance loads in different ways but merely provide identical power source to all appliance loads, resulting in excessive power consumption and inefficiency.

SUMMARY

An aspect of the present disclosure is directed to a portable energy management device that can be remotely controlled to control power supply. It can also supply or cut off power according to a power usage plan of a user such that power management is more effective and convenient.

According to one embodiment of the disclosure, the portable energy management device is disposed between a power outlet and an appliance load to control the supply of power when in use. The portable energy management device includes a transmission module, a micro processing unit, a schedule module, and a power control circuit. The transmission module receives or sends a cable or wireless signal to communicate with a remote control device. A schedule command can be transmitted through a cable or wireless signal. The micro processing unit identifies and analyzes the appliance load and transmits information related to the appliance load to the remote control device through the transmission module. The schedule module executed by the micro processing unit stores and executes the schedule command. The power control circuit is controlled by the schedule command and determines if the power is supplied.

Another aspect of the disclosure is directed to a power management module that can transmit signals to remotely control supply of power. It also controls whether the power is supplied or cut off according to a power usage plan of a user such that power management is more effective and convenient.

According to another embodiment of the disclosure, the power management module is embedded in a remote control device and executed for controlling at least one portable energy management device. The power management module first establishes a connection between the remote control device and the portable energy management device and then receives at least one power management function selected by a user. At least one schedule command is generated according to the power management functions and the types of appliance loads and then the schedule commands are transmitted to the portable energy management devices so that the portable energy management devices execute the schedule commands.

A further aspect of the disclosure is directed to a power management method that can remotely control a portable energy management device to control power supply. It can also supply or cut off power according to a power usage plan of a user such that power management is more effective and convenient.

According to yet another embodiment of the disclosure, the power management method is executed by the portable energy device and the remote control device. The power management method establishes a connection between the remote control device and the portable energy management device and receives at least one power management function selected by a user. At least one schedule command is generated according to the power management function and a type of an appliance load, and the schedule command is transmitted to the portable energy management device. The portable energy management device is set by the schedule command to supply or cut off the power to the appliance load.

The portable energy management device, the power management module and the power management method in the aforementioned embodiments manage and control power usage through remote control and also identify types of appliance loads. They can also supply power according to a power usage plan of a user and the types of the appliance loads, and display the state of the power to the user for reference to effectively and conveniently monitor and control power usage.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
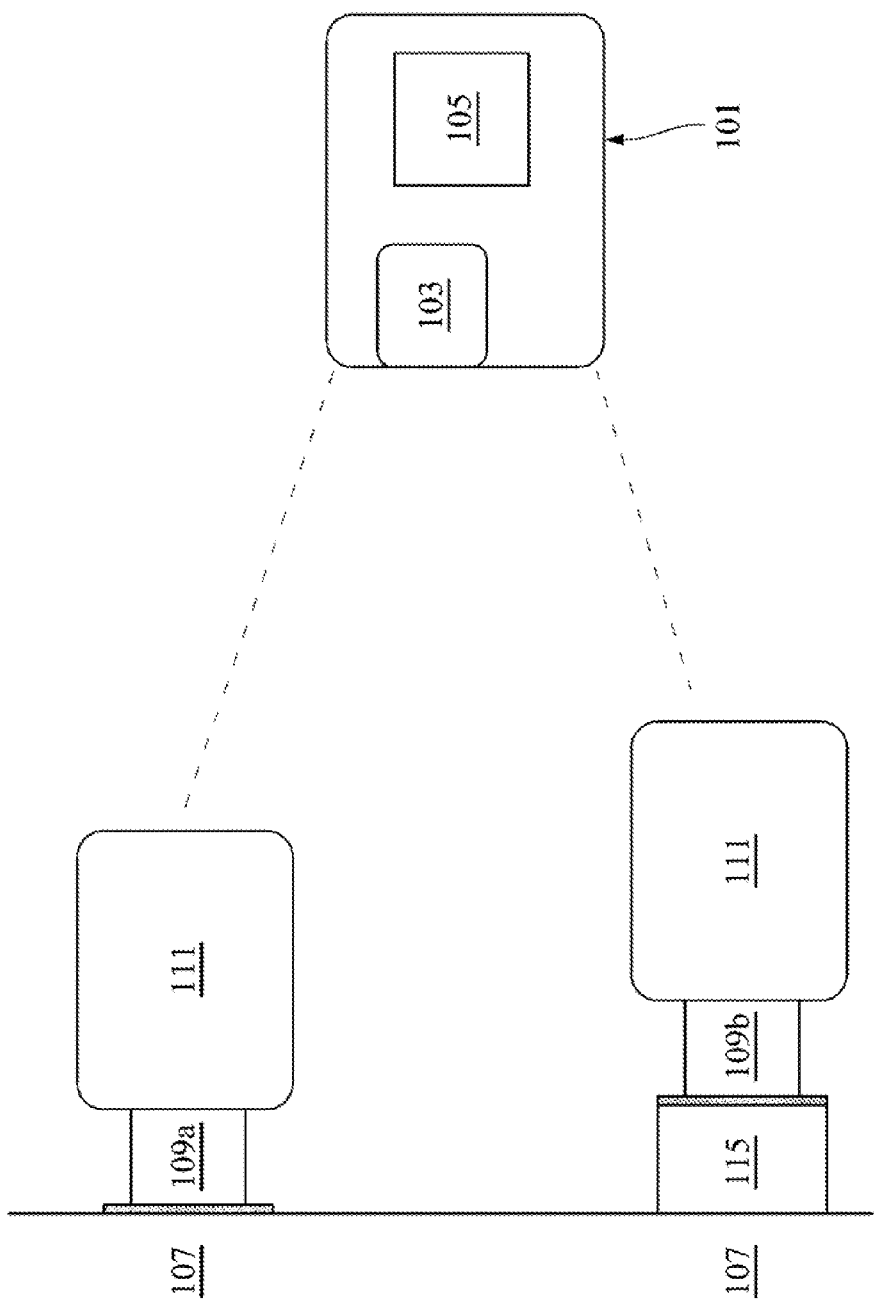
FIG. 1A is a block diagram according to a power management system of the first embodiment of this disclosure.

Reference will now be made in detail to the present embodiments of the invention, examples of which are illustrated in the accompanying drawings. Wherever possible, the same reference numbers are used in the drawings and the description to refer to the same or like parts.

The terms used in this disclosure represent the general meaning. If special terms are used, they will be specifically defined in this disclosure to provide guidance for practitioners. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

More than one way can be used to describe the same matter. Consequently, alternative language and synonyms may be used for any one or more of the terms discussed herein, nor is any special significance to be placed upon whether or not a term is elaborated or discussed herein. It is to be understood that the examples discussed in this disclosure are intended to provide explanation and should not be used to limit the scope of this disclosure.

The terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. In contrast, when a component is "directly connected" or "directly coupled" to another component, there is no additional element in between. The term "and/or" includes one or any combination of the listed items.

Figure 1B:
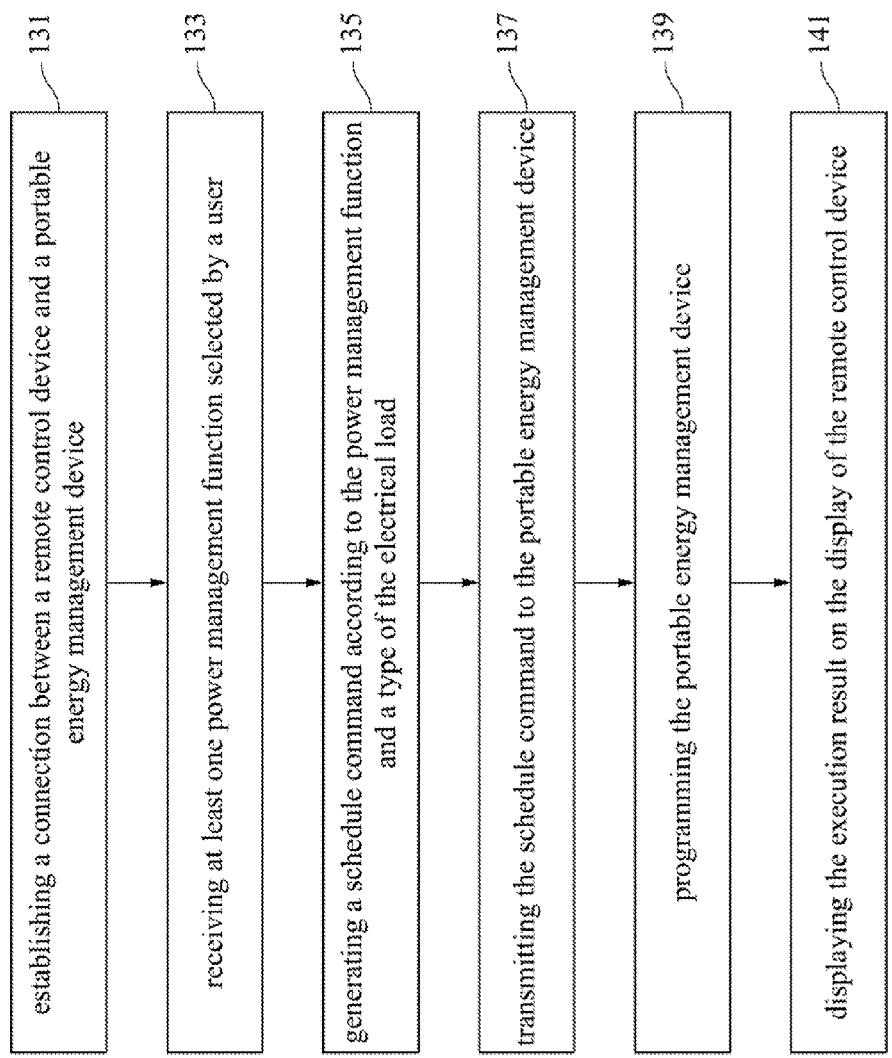
FIG. 1B is a flow chart according to a power management system of the first embodiment of this disclosure.

Reference is made to FIG. 1A and FIG. 1B. FIG. 1A is a block diagram according to a power management system of the first embodiment of this invention. FIG. 1B is a flow chart of a power management method of the first embodiment of this invention. The power management system includes a portable energy management device 109a/109b and a remote control device 101.

The remote control device 101 is a mobile phone, a personal computer, a tablet, a set top box, a smart TV, or any communication-enabled hardware device on which applications can be installed. The remote control device 101 includes a power management module 103 and a display 105. The power management module 103 is a software module or in a form of hardware, and is embedded in the remote control device 101 and executed to control the portable energy management device 109a/109b.

The power management module 103 identifies a type of an appliance load according to the power source data transmitted by the portable energy management device 109a/109b and search for the corresponding schedule command in a database. In one embodiment, the schedule command is conditional, for example, cutting off power when voltage or current exceeds a certain limit. Moreover, the database (not shown in the figure) can also store multiple types of schedule commands. The examples are as follows:

(1) for energy saving, which means the power is cut off when the power consumption per time unit exceeds a certain limit.
(2) for safety, which means the power is cut off in emergency when the current exceeds a certain limit.
(3) for temperature monitoring, which means a particular electrical appliance is turned on when the room temperature exceeds a certain limit.

In the first embodiment, the power management devices are divided into two types: the portable energy management device 109a and the portable energy management device 109b. The portable energy management device 109a is used by itself and with side electrically connected to a power outlet 107, and the other side electrically connected to an appliance load 111. The portable energy management device 109b is used together with a power socket 115. The power socket 115 is electrically connected to the power outlet 107. One side of the portable energy management device 109b is electrically connected to the power socket 115 and the other side is electrically connected to the appliance load 111. The portable energy management device 109a/109b receives the schedule command sent by the power management module 103 and supply the power accordingly to maintain safety. For example, if there is a limit for the power consumption of an electrical heater or a refrigerator, the power is cut off when the power consumption exceeds the limit.

The power management method is executed through the portable energy management device 109a/109b and the remote control device 101. During the execution of the power management method, a cable or wireless connection between the remote control device 101 and the portable energy management device 109a/109b is first established (operation 131). After that, at least one power management function selected by a user is received (operation 133), and the power management functions include power measurement, power analysis, on/off time configuration and alarm message reminder. For example, the user can choose to analyze usage time and power consumption of the appliance load 111 to provide power usage information or set the power to be supplied or cut off at a certain time on a certain day.

After that, the schedule command is generated according to the power management function and a type of the appliance load (operation 135). After the schedule command is generated, the remote control device 101 transmits the schedule command to the portable energy management device 109a/109b in a cable or wireless way (operation 137). The portable energy management device 109a/109b is set according to the schedule command to supply or cut off the power to the appliance load 111 (operation 139).

As a result, the user can remotely turn on or turn off a particular electrical appliance without installing a smart mechanism on the appliance load 111 and gain the advantages of energy saving and household safety. The power supplied to the appliance load 111 is cut off when the voltage, current, power consumption or operating temperature is not within ranges set by the schedule command. Furthermore, when the portable energy management device 109a/109b executes the schedule command to generate an execution result, the execution result can be displayed on the display 105 of the remote control device 101 (operation 141). For example, the execution result of the schedule command is displayed on the display 105 in a form of alarm text, reminder text, or statistical chart and diagram.

Figure 2A:
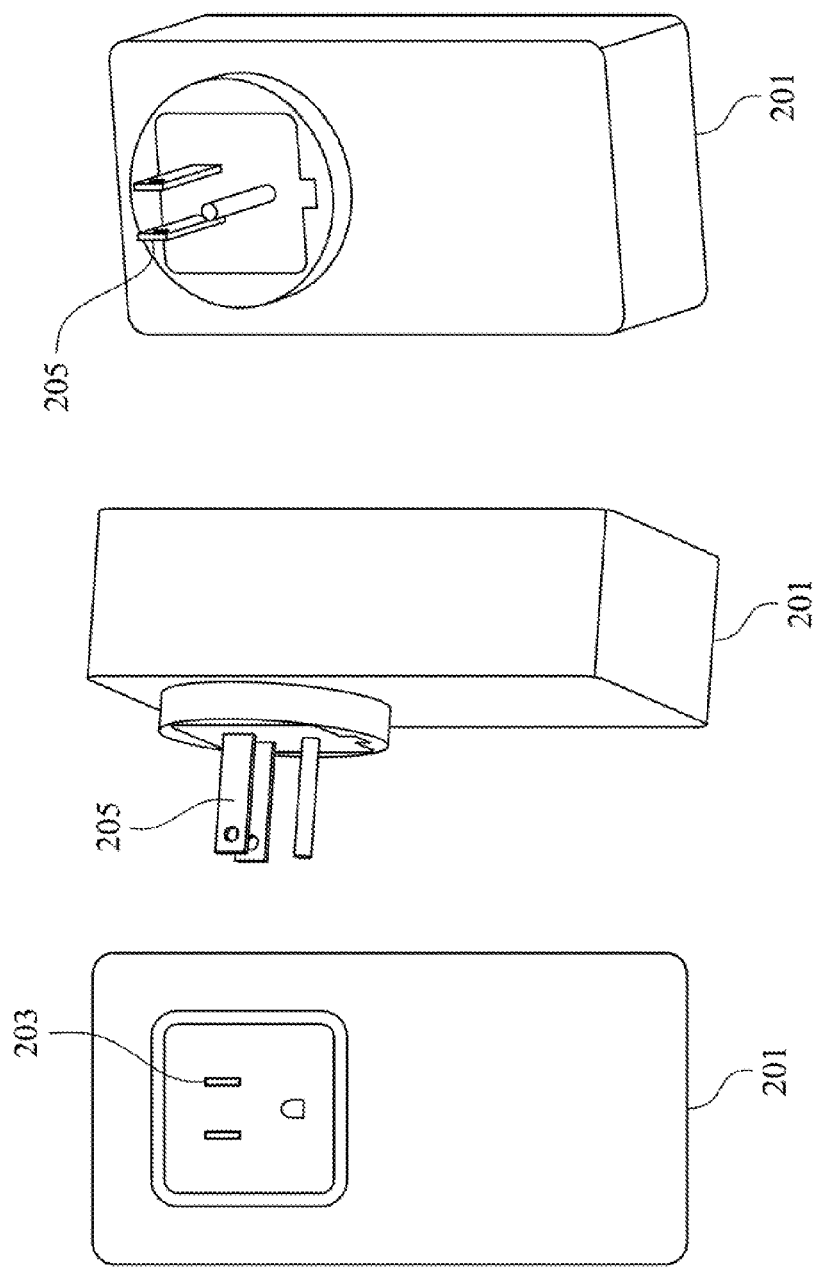
FIG. 2A is a schematic diagram of the external structure according to a portable energy management device of the second embodiment of this disclosure.

FIG. 2A is a schematic diagram of the external structure according to a portable energy management device of the second embodiment of this disclosure. The receptacle 203 disposed on the front side of the portable energy management device 201 can be connected to an appliance load, and the pins 205 disposed on the back side of the portable energy management device 201 can be connected to a power outlet or a power socket. The power socket is a conventional power socket or a smart power socket, so that its overall functions can be applicable or readily adaptable to all technologies.

Figure 2B:
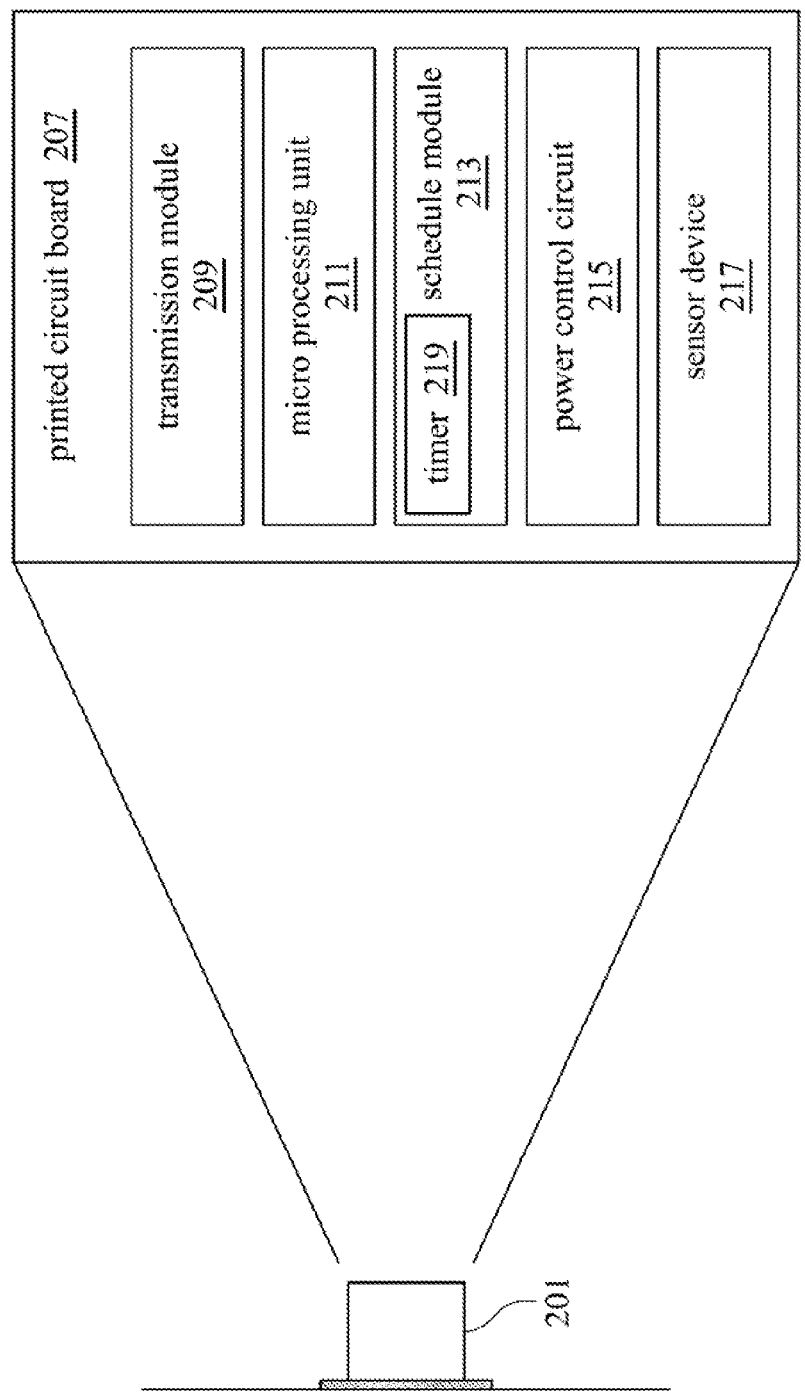
FIG. 2B is an internal block diagram according to a portable energy management device of the second embodiment of this disclosure.

FIG. 2B is an internal block diagram according to a portable energy management device of the second embodiment of this disclosure. The circuit components of the portable energy management device 201 are disposed on a printed circuit board 207 and include a transmission module 209, a micro processing unit 211, a schedule module 213, and a power control circuit 215. The transmission module 209 receives and sends cable or wireless signal to communicate with a remote control device and transmits schedule commands with cable or wireless signal. The micro processing unit 211 identifies and analyzes an appliance load to obtain data related to the appliance load and transmits the data related to the appliance load to the remote control device through the transmission module 209.

The transmission module 209 can be a Bluetooth transmission module, an infrared transmission module, or a transmission module using other types of communication technology. Since Bluetooth is point-to-multipoint communication technology, one remote control device receives signals from multiple portable energy management devices 201. The remote control device provides and transmits the schedule commands customized for the appliance load connected to each portable energy management device 201 according to a power usage plan of a user. Each portable energy management device 201 supplies power to its appliance load according to the aforementioned customized schedule commands.

The micro processing unit 211 executes the schedule module 213 to store and execute the schedule commands. The power control circuit 215 is controlled by the schedule commands to determine whether the power is supplied. The schedule commands are configured for limiting at least one of the following: voltage of the appliance load, current of the appliance load, power consumption of the appliance load, and operating temperature of the appliance load. The appliance load is switched on or off when the voltage, the current, the power consumption or the operating temperature is not within ranges set by the schedule commands. The schedule commands are also configured for activating power management functions of the appliance load, wherein the power management function is power measurement, power analysis, on/off time configuration or alarm message reminder.

The schedule module 213 includes a timer 219 configured for enabling the execution of the schedule commands at a predetermined time, so as to supply or cut off the power to the appliance load. For example, the timer 219 is set to supply or cut off the power at a certain time point on a certain day or at predetermined time intervals. Although the remote control device does not continuously stay connected with the portable power management device 201, the schedule module 213 still executes the schedule commands to supply or cut off the power at the time on the next day according to the configuration of the timer 219. As a result, the user can remotely turn on/off a particular appliance load without installing related smart mechanism on the appliance load and achieve goals of energy saving and electrical safety.

The portable energy management device 201 further includes a sensor device 217 to detect states of surrounding environment and control the power control circuit 215 to supply or cut off the power accordingly. The sensor device 217 is an optical coupler or a vibration sensor. When the optical coupler that serves as the sensor device 217 detects an approaching person, a particular appliance load is switched on (or woken up). The distance from the device to the approaching person is also determined with the strength of Bluetooth signal for Bluetooth is a short-distance wireless communication technology. When the distance is lower than a threshold value, the particular appliance load is switched on. A vibration sensor (leveler) is used to detect earthquakes or other violent shaking such that when an earthquake or shaking is detected, the power to the power control circuit 215 is cut off in emergency to improve electrical safety.

Figure 3:
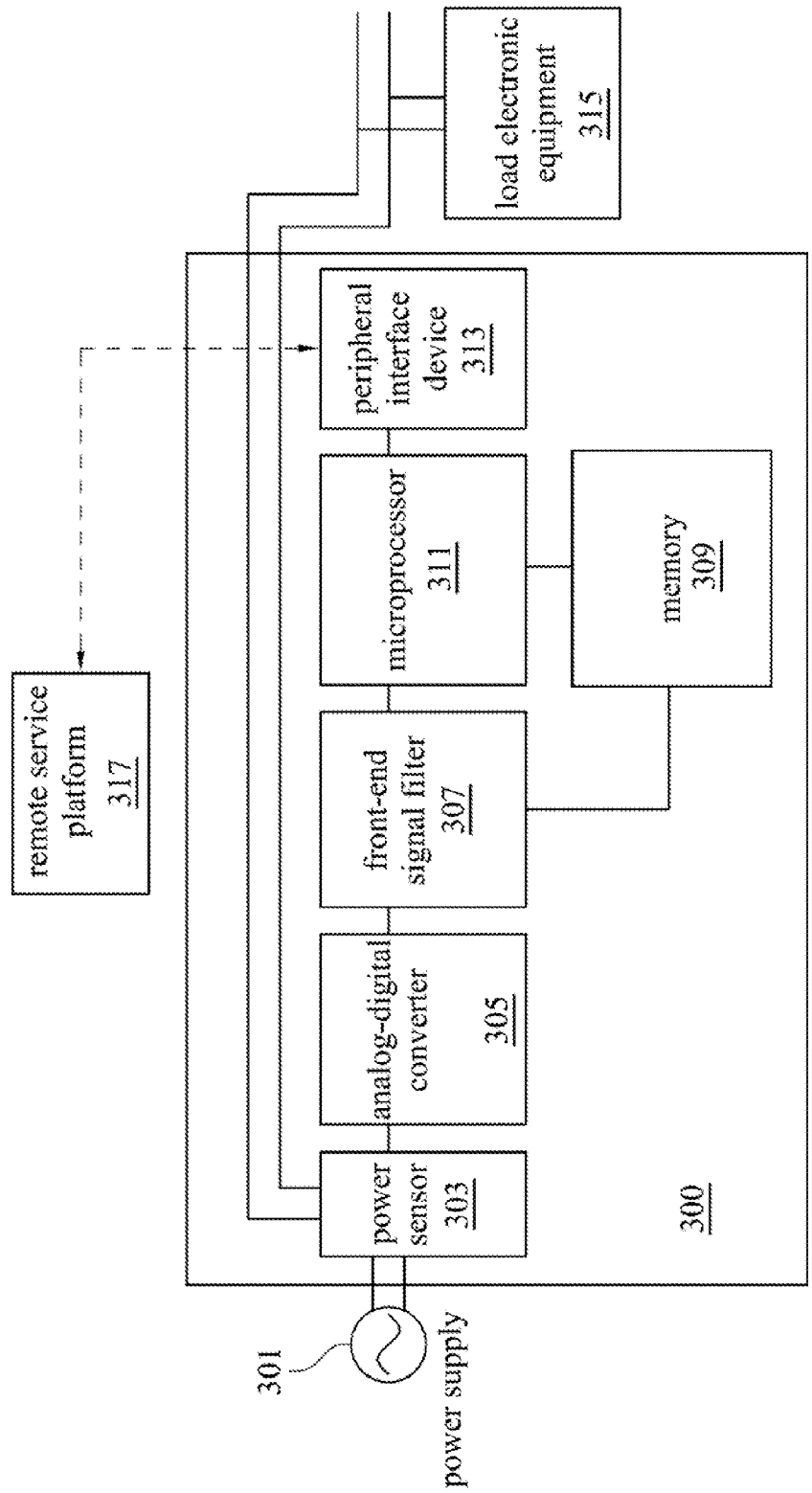
FIG. 3 is a schematic block diagram of the circuit structure according to a power socket of the third embodiment of this disclosure.

FIG. 3 is a schematic block diagram of the circuit structure according to a power socket of the third embodiment of this disclosure. A power socket 300 is disposed between a power supply 301 and a load electronic equipment 315. The power socket 300 transmits alternating current power or direct current power, and monitors the status of the load electronic equipment 315. The power socket 300 monitors appliance load events, which refer to any event leading to possible power consumption, such as switching on of a general electrical fan, switching on of a specific type of fan, switching on of electrical light, switching on of electric cookware, switching on of dehumidifier, switching on of air conditioner, switching on of heater, charging of electrical gadgets, or switching on or off of any other type of electrical appliances. For safety, managerial concerns, or economic concerns, system management personnel monitors and controls usage of electrical appliances with the power socket 300, and further evaluates the usage of the electrical appliances.

The power socket 300 includes a power (including voltage and current) sensor 303, a front-end signal filter 307, a microprocessor 311, and a memory 309 connected to the microprocessor 311. The power sensor 303 senses a power source signal induced by operation of electrical appliances and generates a sensing signal or other signals accordingly. The power source signal may be a current waveform signal or a voltage waveform signal, or may even be an acoustic, thermal, or electromagnetic signal. An analog-digital converter 305 connects to the power sensor 303, and converts the sensing signal from analog to digital when the sensing signal is analog.

The front-end signal filter 307 filters the sensing signal according to signal filtering rules. In one embodiment, the front-end signal filter 307 is implemented with hardware (e.g., a digital signal processor, DSP) and its related firmware. In another embodiment, the front-end signal filter 307 is implemented with a field programmable gate array, FPGA. In yet another embodiment, it is implemented with an application specific integrated circuit, ASIC.

In one embodiment, the front-end signal filter 307 is pre-installed in the power socket 300. The signal filtering rules are preloaded in the power socket 300 or downloaded through the Internet. The front-end signal filter 307 and the signal filtering rules specify whether or not to filter the incoming signals. For example, the front-end signal filter 307 filters detects the rate of power consumption, and the signal filtering rules specify a lower limit of power consumption. When the power consumption associated with the appliance load event is less than the lower limit, the sensing signal is filtered out, such that the microprocessor 311 saves unnecessary power consumption of analyzing and identifying the sensing signal.

The microprocessor 311 identifies and analyzes a preserved sensing signal passing through the front-end signal filter 307, and determines if the preserved sensing signal is associated with a predetermined combination of the appliance load events. As mentioned above, the microprocessor 311 does not analyze nor identify a filtered out sensing signal, and thus saves the unnecessary power consumption. The predetermined combinations of the appliance load events include switching on of a general electrical fan, switching on of a specific type of fan, switching on of electrical light, switching on of electric cookware (e.g., immersion heaters), switching on of dehumidifier, switching on of air conditioner, switching on of heater and all events leading to power consumption. The microprocessor 311 performs analysis and identification so as to extract signatures from the preserved sensing signal.

The power socket 300 further includes a peripheral interface device 313 connected to a remote service platform 317 for data transmission. For example, the peripheral interface device 313 connects to the remote service platform 317 to download the signal filtering rules. The peripheral interface device 313 is a wireless local area network (WLAN) device, an Ethernet device, a 3G compatible network device, or a 4G compatible network device.

Figure 4:
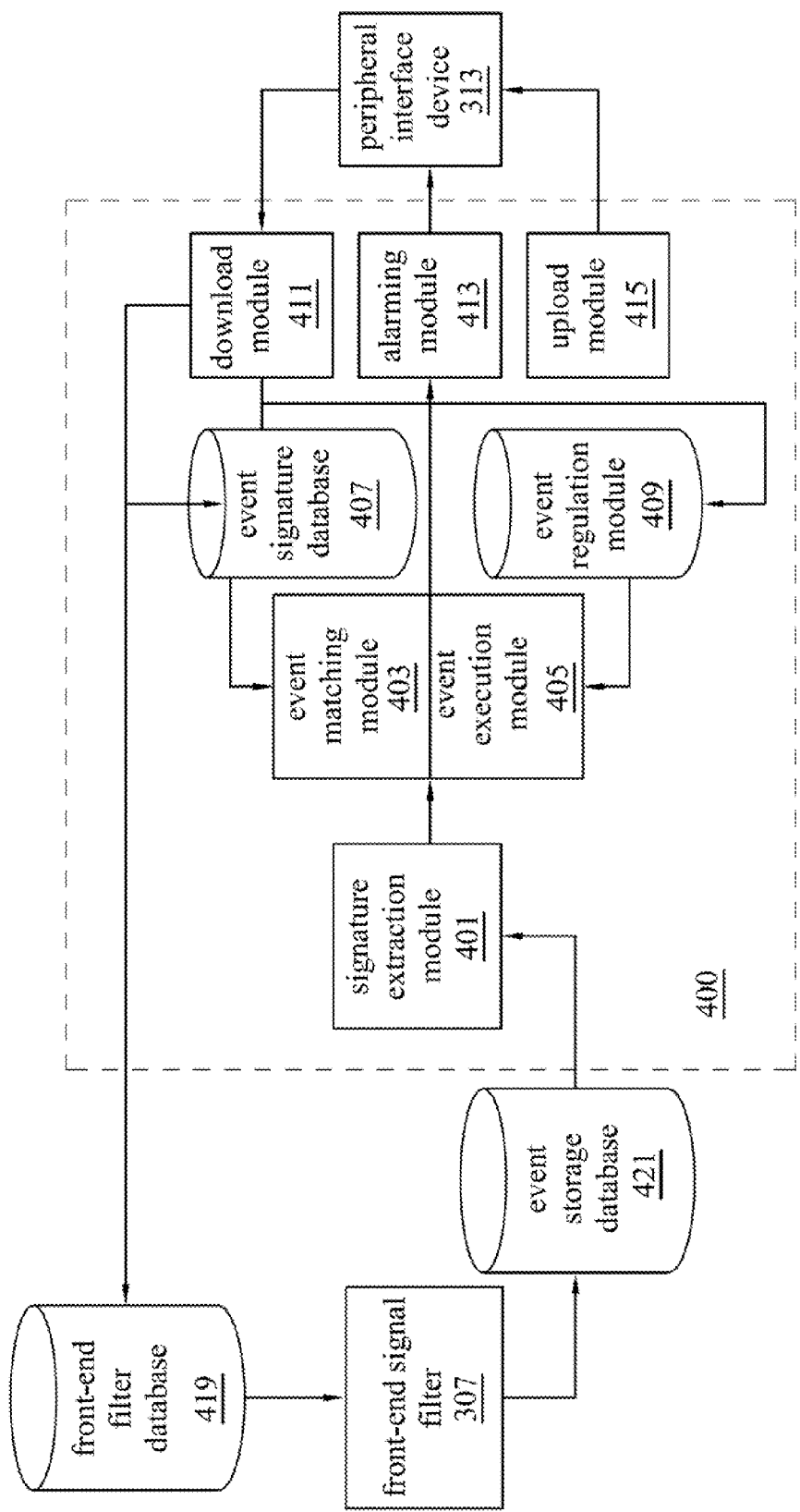
FIG. 4 is a block diagram of the software structure according to a power socket according to the third embodiment of this disclosure.

FIG. 4 is a block diagram of the software structure according to a power socket of the third embodiment of this disclosure. An event storage database 421 is configured to store the preserved sensing signals, and a peripheral interface device transmits the preserved sensing signals to the remote service platform to share the preserved sensing signals. A front-end filter database 419 stores settings of a front-end signal filter and signal filtering rules, including hardware settings of the front-end signal filter, software settings of the front-end signal filter, logs of the signal filtering rules, firmware settings of the front-end signal filter (e.g., program bit stream logs), and these settings are preloaded or downloaded from the Internet.

A software module 400 is mainly executed by a microprocessor and includes a signature extraction module 401, an event signature database 407 and an event matching module 403.

The signature extraction module 401 is stored in a non-transitory computer readable storage medium and executed by the microprocessor to extracts signature values from the preserved sensing signal. The signature values associated with an appliance load event include at least one of the following: active power, reactive power, root mean square value, harmonics, characteristics of voltage, characteristics of current. For example, the signature value is a rate of current increase, a rate of voltage increase, or even a ripple characteristic. The event signature database 407 is configured to store data associated with the predetermined combinations of the appliance load events. These predetermined combinations of the appliance load events are preloaded in the event signature database 407 at initialization or downloaded to the event signature database 407. The event matching module 403 is stored in the non-transitory computer readable storage medium and executed by the microprocessor, and identifies whether the signature values are associated with data of the predetermined combinations of the appliance load events.

An example of a set of signature values is $E_i = \{S_1^i, S_2^i, \ldots, S_n^i\}$, and $S_1^i$: is the 1st signature value of the ith event. The event signature database 407 stores the signature values of the appliance load events to which the power socket is set to respond, and similarity functions of the signature values including $F_1^j(x), F_2^j(x), \ldots,$ and $F_n^j(x)$. $F_1^j(S_1^i)$ is the similarity of the 1st signature value of the ith event to the 1st signature value of the jth appliance load event in the event signature database 407, and the value of $F_{1j}(S_1^j)$ is between 0 and 1.

$$\prod_{k=1}^{n} \omega_k F_k^j(S_k^i)$$

is obtained by taking the signature values of the ith event $E_i = \{S_1^i, S_2^i, \ldots, S_n^i\}$ as input of the similarity function of the jth appliance load event and combining all signature values, and $\omega_k$ is an importance factor of the kth signature value.

The software module 400 further includes an event regulation module 409 and an event execution module 405. The event regulation module 409 is stored in the non-transitory computer readable storage medium for keeping record of multiple event regulations. The event regulations are preloaded at initialization or downloaded from the Internet to the event regulation module 409. The event execution module 405 is executed by a microprocessor, and when the similarity measure of the signature values indicates the signature values are similar to the data of one of the predetermined combinations of the appliance load events in the event signature database 407, the microprocessor responds by controlling the power socket to execute a command. For example, the microprocessor controls the event execution module 405 to handle the appliance load event according to event regulations.

An alarming module 413 is also stored in the non-transitory computer readable storage medium and is controlled by the event execution module 405 to announce alarms. The alarming module 413 generates alarm sound or cut off the power to alarm users and administrators. Furthermore, the alarming module 413 sends a notification to the remote service platform through the peripheral interface device 313 so that the remote service platform performs subsequent processes.

A download module 411 and an upload module 415 are stored in the non-transitory computer readable storage medium and executed by the microprocessor. The download module 411 downloads data to the signature event database 407 and event regulation module 409 through the peripheral interface device 313. The upload module 411 uploads the preserved sensing signals and other information for sharing to the remote service platform.

In the second embodiment, the power socket 300 is integrated with the portable energy management device. While in the third embodiment, the power socket 300 is configured to detect power source signal of the appliance loads, extract signature values, and identify the type of the appliance loads. The power socket 300 in the third embodiment can be integrated with the portable energy management device in the first embodiment. In other words, the functions of identifying types of appliance loads and activating power management functions according to the types of the appliance loads can be integrated to the portable energy management device. The details of operation are as described above and not repeated herein.

The portable energy management device, power management module and power management method in the aforementioned embodiments control power usage through a remote control method. The functions also include identifying types of appliance loads, determining whether or when to supply or cut off power according to the types of the appliance loads and power usage plans and schedule commands of users, and displaying the state of power usage for users. Therefore, controlling and managing power usage is done in an effective and convenient way, and electrical safety and power efficiency are improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A portable energy management device disposed between a power outlet and an appliance load so as to control power supply while in use, the portable energy management device comprising:
   a transmission module configured for receiving or sending a cable signal or a wireless signal to communicate with a remote control device, wherein a schedule commend is transmitted through the cable signal or the wireless signal;
   a micro processing unit configured for analyzing and identifying the appliance load and transmitting information related to the appliance load to the remote control device through the transmission module;
   a schedule module executed by the micro processing unit and configured for storing and executing the schedule command; and
   power control circuit controlled by the schedule command to determine whether the power is supplied; and
   front-end signal filter detecting a power consumption rate of power source signal, wherein the consumption rate is associated with the appliance load, when the power consumption rate is less than a default lower limit, the front-end signal filter filters out he power source signal.

2. The portable energy management device as claimed in claim 1, wherein the micro processing unit is configured for identifying and analyzing a power source signal of the appliance load, wherein the power source signal is a voltage signal or a current signal.

3. The portable energy management device as claimed in claim 1, wherein the schedule module comprises a timer configured for executing the schedule command at a predetermined time, so as to supply or cut off the power to the appliance load.

4. The portable energy management device as claimed in claim 1, wherein the schedule command is configured for limiting at least one of voltage of the appliance load, current of the appliance load, power consumption of the appliance load, and an operating temperature of the appliance load,
   wherein the appliance load is switched on or off when the voltage, the current, the power consumption or the operating temperature exceeds a range set by the schedule command.

5. The portable energy management device as claimed in claim 1 wherein the schedule command is configured for activating at least one power management function of the appliance load, wherein the power management function is power measurement, power analysis, on/off time configuration or alarm message reminder.

6. The portable energy management device as claimed in claim 5, wherein an execution result of power measurement, power analysis, on/off time configuration or alarm message reminder is displayed on a display of the remote control device.

7. The portable energy management device a claimed in claim 1, wherein the transmission module is a Bluetooth transmission module.

8. The portable energy management device as claimed claim 1, further comprising:
   sensor device configured for detecting states of surrounding environment and controlling whether to supply or cut off the power to the power control circuit accordingly.

9. The portable energy management device as claimed in claim 8, wherein the sensor device is an optical coupler or a vibration sensor.

10. The portable energy management device as claimed in claim 1, wherein the transmission module, the micro processing unit, the schedule module and the power control circuit are disposed on a printed circuit board.

11. A power management module embedded in a remote control device and executed for controlling at least one portable energy management device, and operating steps executed by the power management module comprising:
    establishing a cable or wireless connection between the remote control device and the portable energy management device;
    receiving at least one power management function selected by a user;
    generating at least one schedule command according to the power management function and a type of an appliance load;
    transmitting the schedule command to the portable energy management device so that the portable energy management device executes the schedule command;
    detecting a power consumption rate of a power source signal, wherein the power consumption rate is associated with the appliance load; and
    filtering out the power source signal when the power consumption rate is less than a default lower limit.

12. The power management module as claimed in claim 11, further comprising:
    displaying an execution result on a display of the remote control device when the portable energy management device executes the schedule command to generate the execution result.

13. The power management module as claimed in claim 12, wherein the execution result of the schedule command is displayed on the display in a form of alarm text, reminder text, or statistical chart and diagram.

14. The power management module as claimed in claim 12, wherein the schedule command is configured for activating at least one power management function of the appliance load, wherein the power management function is power measurement, power analysis, on/off time configuration or alarm message reminder.

15. A power management method executed through a portable energy management device and a remote control device, comprising:
    establishing a cable or wireless connection between the remote control device and the portable energy management device;
    receiving at least one power management function selected by a user;
    generating at least one schedule command according to the power management function and a type of an appliance load;

transmitting the schedule command to the portable energy management device;

setting the portable energy management device according to the schedule command so as to supply or cut off power to the appliance load;

detecting a power consumption rate of a power source signal, wherein the power consumption rate is associated with the appliance load; and filtering out the power source signal when the power consumption rate is less than a default lower limit.

16. The power management method as claimed in claim 15, wherein the power to the appliance load is cut off when voltage, current, power consumption or operating temperature is not within ranges set by the schedule command.

17. The power management method as claimed in claim 15, further comprising:

displaying an execution result generated by the schedule command of the portable energy management device on a display of the remote control device.

* * * * *